United States Patent [19]
Newby

[11] Patent Number: 6,138,876
[45] Date of Patent: Oct. 31, 2000

[54] MULTIPLE CHAMBER LIQUID DISPENSING DEVICE

[76] Inventor: John C. Newby, P.O. Box 989, Cobb, Calif. 95426

[21] Appl. No.: 09/332,410

[22] Filed: Jun. 14, 1999

[51] Int. Cl.$^7$ .................................................. A01K 39/02
[52] U.S. Cl. ............................................. 222/457; 119/77
[58] Field of Search ................................ 222/185.1, 457; 137/453; 239/63, 76; 47/79; 119/77

[56] References Cited

U.S. PATENT DOCUMENTS

| | | | |
|---|---|---|---|
| 1,091,392 | 5/1914 | Schlichtinger | 119/77 |
| 2,600,103 | 6/1952 | Feck | 119/77 |
| 4,573,434 | 3/1986 | Gardner . | |
| 5,218,926 | 6/1993 | Wenstrand | 119/77 |
| 5,247,994 | 9/1993 | Nenniger . | |
| 5,269,259 | 12/1993 | Keeler . | |
| 5,303,674 | 4/1994 | Hyde, Jr. | 119/77 |
| 5,353,742 | 10/1994 | Mauritz | 119/77 |
| 5,427,058 | 6/1995 | Chung . | |
| 5,454,348 | 10/1995 | Colwell . | |
| 5,494,000 | 2/1996 | Tanabe . | |
| 5,628,277 | 5/1997 | Machado . | |
| 5,682,835 | 11/1997 | Walter et al. | 119/77 X |
| 5,687,783 | 11/1997 | Finnigan . | |

*Primary Examiner*—Kenneth Bomberg

[57] ABSTRACT

This device for plant, animal and bird feeders uses liquid container bottles of the type which are supported in an inverted position and have an outlet opening at its lower end which is in communication with a container basin. A deflated airtight flexible chamber is preassembled to a container basin with a tube outlet to the atmosphere through the container basin bottom. The container bottle is set in an upright position and filled with liquid. The deflated flexible chamber is then inserted into the liquid container threaded neck. This threaded neck is screwed into a threaded receptacle within the basin. The entire assembly is now rotated into an inverted position. Part of the fluid within the container bottle partially fills the container basin and seals the container bottle outlet orifice and because of gravity a partial vacuum is created in the upper region of the container bottle. The forces now acting upon this assembly are; atmospheric pressure on the inside of the flexible chamber and atmospheric pressure on the surface of the liquid in the container basin. The system is now at equilibrium with the space created by the partial vacuum. Any temperature rise affecting the partial vacuum can affect this equilibrium. In order for the fluid to exit the bottle into the container basin it must overcome the resisting force produced by the liquid within the container basin and the atmospheric pressure impinging upon this surface. The relationship of the atmospheric pressure and the area within the container basin is as stated in the following equation: P=F/A or F=PA. From this it follows that the larger the area the greater the force required to raise the level of the fluid within the basin. The pressure inside the airtight flexible inner chamber is always atmospheric. The final result is that the flexible inner chamber contracts and very little of the fluid exits the outer chamber when the pressure in the partial vacuum region is increased due to a temperature increase.

3 Claims, 3 Drawing Sheets

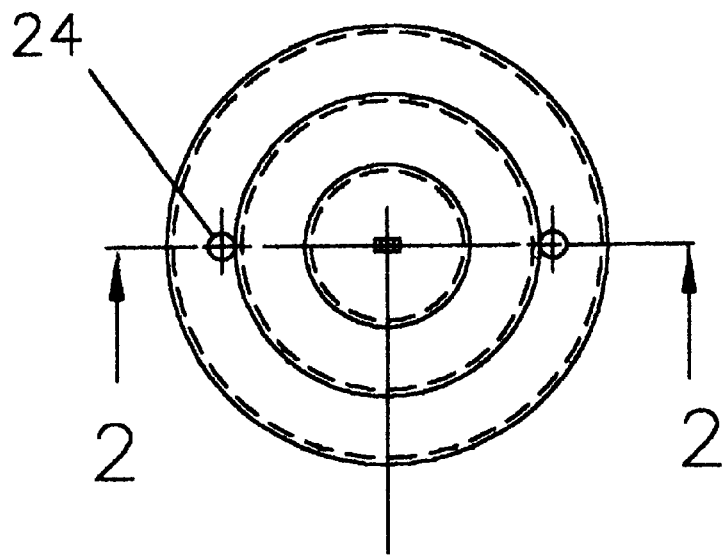
FIG -1-
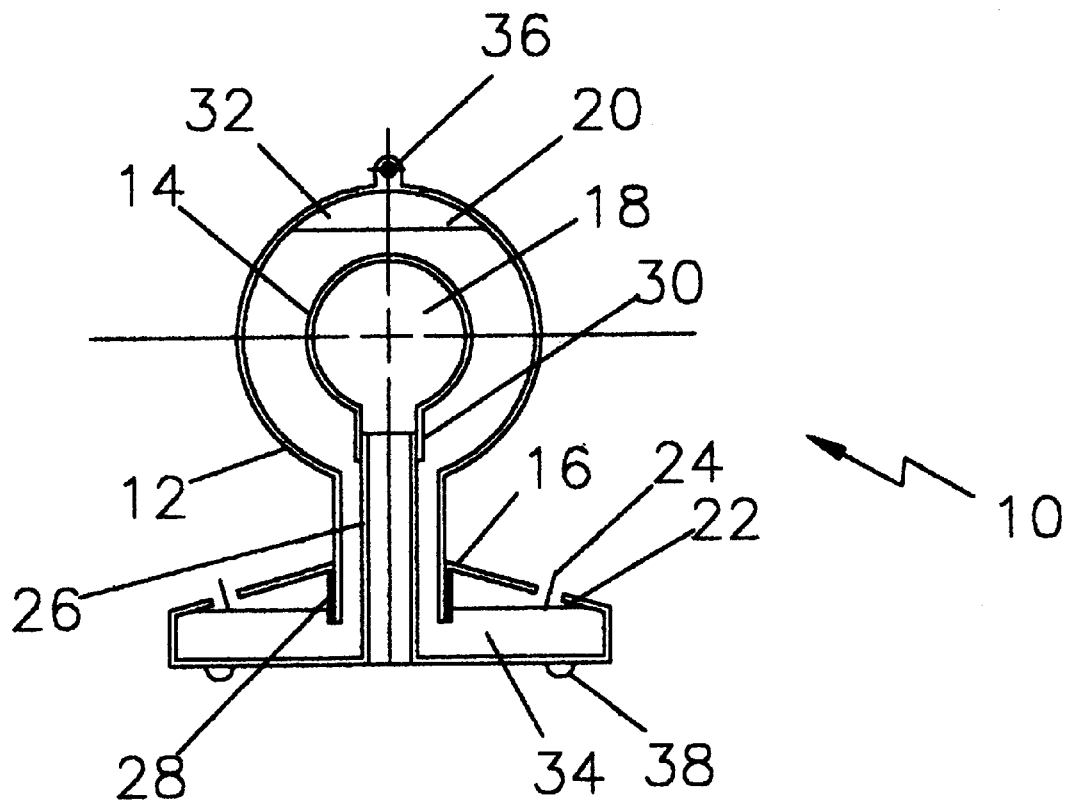
FIG -2-

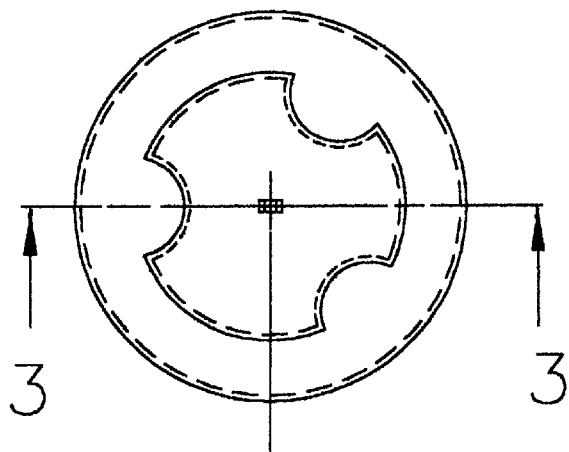
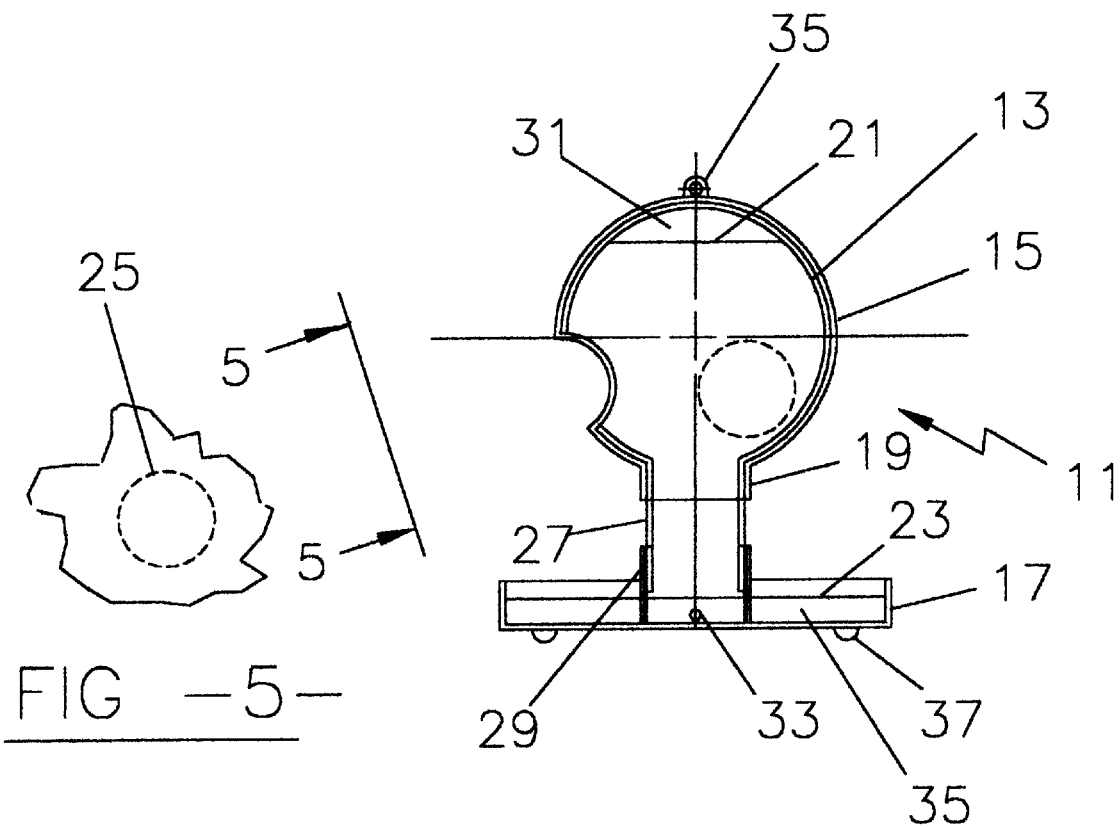

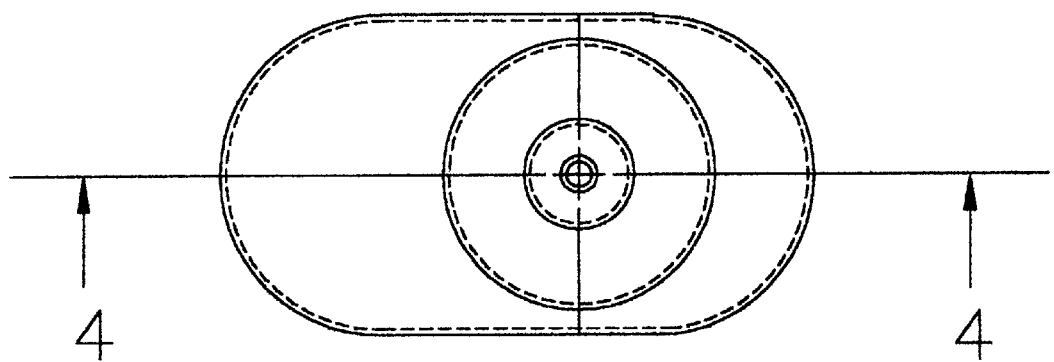
FIG -6-
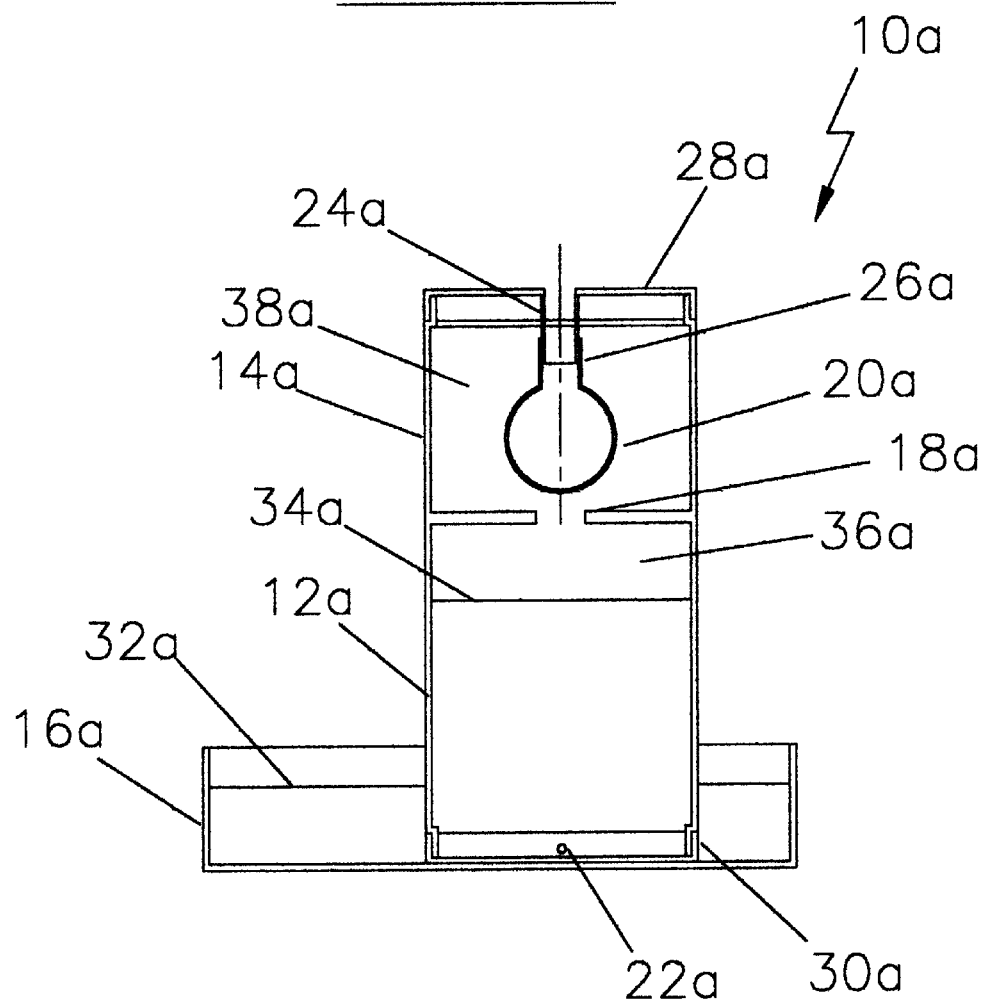
FIG -7-

MULTIPLE CHAMBER LIQUID DISPENSING DEVICE

BACKGROUND OF THE INVENTION

1. Field of the invention

This invention relates generally to liquid dispensing devices for plants, animals and bird feeders and more particularly to liquid container bottles of the type which are supported in an inverted position and have an outlet orifice at its lower end which is in communication with a container basin.

2. Description of Prior Art

Various inverted dispensing fluid devices have been in use for years by pet owners and poultry farmers to water pets or fowl and by bird lovers as hummingbird feeders. In many of these devices a tube is installed in the lower end of the dispensing device. In different versions the neck of the container is installed at a predetermined height into a container basin which contains a portion of the dispensing device liquid. In both of these type dispensers gravitational pull on the liquid creates a partial vacuum at the upper region of the dispensing container. These type containers have some major advantages over open container, which are, they reduce evaporation and reduce airborne contamination. One disadvantage is that a rise in temperature can increase the pressure of the air within the partial vacuum space at the upper region of the dispensing container. This increase in pressure can force fluid to exit the device.

SUMMARY OF INVENTION

This invention, a liquid dispensing device for plants, animals and bird feeders uses liquid container bottles of the type which are supported in an inverted position and have an outlet opening at its lower end which is in communication with a container basin. A flexible chamber is installed in a container basin with an outlet to the atmosphere through the basin bottom. The flexible chamber is now inserted into the threaded container neck. This threaded neck is screwed into a receptacle within the basin. The entire assembly is now rotated into an inverted position. The principle operating in this device is that when the container bottle is filled and then inverted, part of the fluid exits the container. This continues until the rigid container outlet orifice is submerged and a partial vacuum has been produced in the upper region of the rigid container and the flexible chamber has been inflated. The forces acting upon the liquid dispensing assembly are; atmospheric pressure on the inside of the flexible chamber, atmospheric pressure on the surface of the liquid in the container basin. These forces are at equilibrium with the partial vacuum created in the upper region of the rigid container. Any rise in ambient temperature can cause the pressure to increase within the space created by the partial vacuum. This is caused by the expansion of the air and vapor contained within this space. When this occurs the force produced can be greater than the atmospheric pressure existing within the flexible chamber. The surface area of the fluid within the container basin which is open to the atmosphere is sealing the end of the rigid container outlet. In order for the fluid to exit the rigid container it must overcome the force as stated in the following equation: $P=F/A$ or $F=PA$. From this it follows that the larger the area the greater the force required to raise the level of the fluid within the container basin. Because it offers the least resistance to an increasing pressure, the inner flexible chamber would be the surface to react the greatest amount by contracting to a smaller size. The device can also be constructed with two separate rigid containers. One lower chamber would contain the liquid to be dispensed through an orifice into a container basin, which is open to the atmosphere. The second upper chamber would contain the flexible chamber. These two rigid containers would be in communication with each other and have common air shared through a connecting orifice. The flexible chamber within the upper chamber is only open to the atmosphere at its outlet orifice. When the common air within the two chambers is expanded by a temperature rise, the flexible chamber partially collapses, therefore reducing the amount of liquid being forced out of the liquid chamber orifice via the liquid containing basin.

Another variation in the construction of this device is to combine the two chambers. This could be accomplished by placing openings through the surface of the rigid chamber and covering these openings with a flexible outer chamber. This would be the only alteration of an existing liquid dispensing device that would be required so that the assembly would function similar to a double chamber dispenser.

BRIEF DESCRIPTION OF THE DRAWING

FIG. 1 is a top view of a preferred embodiment of the present invention.

FIG. 2 is a cross section taken along line 2—2 of FIG. 1 with the dispenser filled with liquid.

FIG. 3 is a top view of a preferred embodiment of the present invention.

FIG. 4. is a cross section taken along line 3—3 of FIG. 3 with the dispenser filled with liquid.

FIG. 5 is a partial view of FIG. 4 taken along line 5—5.

FIG. 6. is a top view of a preferred embodiment of the present invention.

FIG. 7. is a cross section taken along line 4—4 of FIG. 6 with the dispenser filled with liquid.

DETAILED DESCRIPTION OF THE PREFERRED EMBODIMENT(S)

Referring to FIGS. 1–2. A double chamber liquid dispensing system assembly 10. In accordance with the present invention includes a outer chamber 12, made from glass or plastic which can be transparent or opaque. Both rigid outer chamber 12 and inner flexible chamber 14 are connected to container basin 16. The flexible inner chamber 14 is shown as a spherical shape but can be made in any appropriate shape such as a bellows, balloon, cylinder, diaphragm or figure; and the material can be rubber, plastic or impermeable cloth. The material can be of any color and can be reflective, transparent or opaque. The outer chamber 12 is in communication with container basin 16 through threaded connector 28 and the flexible inner chamber 14 is in communication with the atmosphere through tube connector 26. Container basin 16 shows a threaded connection 28 to outer rigid chamber 12, however this could also be in some models connected with a close slip fit. Lower portion 30 of flexible inner chamber 14 has an airtight connection to tube 26. Tube 26 a part of the container basin and is open to the atmosphere. The assembly can either be hung from eyelet 36 or set on a flat surface on three or more extruded or attached legs 38. The container basin may be enclosed and have one or more access holes 24 open to the atmosphere.

The operation of the present invention will be discussed with reference to FIGS. 1–2. Outer chamber 12 while in an upright position is filled with liquid. With outer chamber 12 filled and in an upright position inner flexible chamber 14 preassembled to container basin 16. Flexible chamber 14 is inserted into the neck of outer chamber 12. The two threaded portion of outer chamber 12 and container basin 16 are rotated relative to each other until the desired fit is acquired. The assembly 10 is now rotated into an inverted position. The liquid, because of gravitational forces and atmospheric pressure, assumes the approximate positions indicated. The two positions are liquid level 22 in container basin 16 and liquid level 20 in rigid outer chamber 12. A partial vacuum space 32 is created the upper region of outer chamber 12 as liquid exits this chamber. The assembly 10 is now ready for dispensing of the contained liquid. The volume 18 contained within flexible chamber 14 and the volume 34 contained within container basin 16 are open to atmospheric pressure. The assembly may be hung from eyelet 36 or set on extruded or attached legs 38 located on container basin 16 bottom.

Referring to FIGS. 3–4. A a double chamber liquid dispensing system assembly 11. In accordance with the present invention includes a inner rigid chamber 13 which can be made from glass or plastic with one or more openings 25 in its lower wall, and an outer flexible chamber 15, which can be made from rubber, plastic or impermeable cloth. The material can be of any color and can be reflective, transparent or opaque. Both inner rigid chamber 13 and outer flexible chamber 15 connected to container basin 17. The rigid inner chamber 13 is in communication with container basin 17 through threaded connector 29. Connector 29 has one or more orifices 33 in communication with container basin 17. Lower portion 19 of flexible outer chamber 15 has an airtight connection to lower rigid chamber 27. Lower rigid chamber 27 extends into container basin 17 and is in communication with container basin 17 through orifice 33.

The operation of the present invention will be discussed with reference to FIGS. 3–4. Inner chamber 13 preassembled to flexible outer chamber 15 is filled with liquid while in an upright position. The two threaded portions of inner chamber 13 and container basin 17 are rotated relative to each other until the desired fit is acquired. The assembly 11 is now rotated into an inverted position. The liquid because of gravitational forces and atmospheric pressure assumes the approximate positions indicated. Liquid level 23 in container basin 17 and liquid level 21 in inner chamber 13. A partial vacuum space 31 is created as liquid exits rigid inner chamber 13. The assembly can either be hung from eyelet 35 or set on a flat surface on three or more extruded or attached legs 37. Referring to FIGS. 6–7. A a triple chamber liquid dispensing system assembly 10a. In accordance with the present invention includes a lower chamber 12a, an upper chamber 14a. resting in container basin 16a, Both lower chamber 12a and upper chamber 14a are in communication with each other through orifice 18a. The flexible inner chamber 20a is shown as a spherical shape but can be made in any appropriate shape. The lower chamber 12a is in communication with container basin 16a through orifice 22a through cover 30a of lower chamber 12a and the flexible inner chamber 20a is in communication with the atmosphere through tube connector 24a. Upper portion 26a of flexible inner chamber 20a has an airtight connection to tube 24a. Tube 26a a part of the upper chamber cover 28a and is open to the atmosphere.

The operation of the present invention will be discussed with reference to FIGS. 6–7. Lower chamber 12a while in an upright position with cover 30a removed is filled with predetermined amount of liquid. After the cover 30a is replaced, the assembly 10a is now rotated into an inverted position and placed into the container basin 16a. The liquid levels because of gravitational forces and atmospheric pressure assumes the approximate positions indicated. That is, liquid level 32a in container basin 16a and liquid level 34a in lower chamber 12a. A partial vacuum space 38a is created in upper chamber 14a and partial vacuum space 36a in lower chamber 12a as liquid exits this chamber. The assembly 10a is now ready for dispensing of the contained liquid.

While this invention has been described in terms of a few preferred embodiments, it is contemplated that persons reading the proceedings descriptions and studying the drawings will realize various alterations, permutations and modifications thereof. It is therefore intended that the following appended claims be interpreted as including all such alterations, permutations and modification as fall within the true spirit and scope of the present invention.

What is claimed is:

1. A double chamber liquid dispensing assembly adapted to reduce the effects of temperature increase upon a liquid in said dispensing assembly, said dispensing assembly comprising:

a container basin, a container basin cover, a rigid outer chamber and a flexible inner chamber, said container basin having connections connecting both said rigid outer chamber and said flexible inner chamber, said container basin having a bottom including a connector orifice and at least three legs, said rigid chamber communicating with said container basin through a connector orifice, an airtight connector tube connecting said container basin orifice with said flexible inner chamber in an airtight relationship and allowing said flexible inner chamber to communicate with the atmosphere, said container basin cover having at least one access hole open to the atmosphere, said rigid outer chamber including an eyelet at an uppermost location, and said flexible inner chamber coated with reflective coating providing heat reflection, said flexible inner chamber contracting inwardly when pressure on an outer surface thereof is greater than on an inner surface thereby reducing the effects of temperature increase upon the liquid in the container basin.

2. A double chamber liquid dispensing assembly adapted to reduce the effects of temperature increase upon a liquid in said dispensing assembly, said dispensing assembly comprising:

a container basin, a rigid inner chamber and a flexible outer chamber, said container basin having a threaded connection connecting said rigid inner chamber and communicating said rigid inner chamber with said container basin through at least one connector orifice, said container basin having a bottom with at least there legs, said inner rigid chamber including a predetermined number of orifices of a predetermined size, said rigid chamber further including an eyelet attached at uppermost region thereof, said flexible outer chamber coupled to said rigid inner chamber with an airtight connection around said inner rigid chamber eyelet and at an output end of said rigid inner chamber, said flexible outer chamber expanding outwardly when pressure on an inner surface thereof in a region of the rigid chamber orifices is greater than on an outer surface, thereby reducing the effects of temperature increase upon the liquid in the container basin.

3. A triple chamber liquid dispensing assembly adapted to reduce the effects of temperature increase upon a liquid in said dispensing assembly, said dispensing assembly comprising:

a container basin, a rigid lower chamber, a rigid upper chamber, and a flexible inner chamber, said container basin of a predetermined size and having a predetermined wall height, said rigid lower chamber connected to said container basin and having an output orifice permitting communication with said container basin, said rigid upper chamber connected to said rigid lower chamber and having an output orifice permitting communication with said rigid lower chamber, said flexible inner chamber located within said rigid upper chamber and coupled to a cover of said rigid upper chamber with airtight connection allowing the flexible inner chamber communication with the atmosphere, said flexible inner chamber contracting inwardly when pressure on an outer surface thereof is greater than on an inner surface, thereby reducing the effects of temperature increase upon the liquid in the container basin.

* * * * *